(12) United States Patent
Kitazaki et al.

(10) Patent No.: US 10,406,504 B2
(45) Date of Patent: Sep. 10, 2019

(54) PHOTOCATALYST COATED BODY AND METHOD OF MAKING

(71) Applicant: TOTO LTD., Kitakyushu-Shi, Fukuoka (JP)

(72) Inventors: Satoru Kitazaki, Fukuoka-Ken (JP); Kyoko Kataoka, Fukuoka-Ken (JP)

(73) Assignee: Toto Ltd., Fukuoka (JP)

( * ) Notice: Subject to any disclaimer, the term of this patent is extended or adjusted under 35 U.S.C. 154(b) by 75 days.

(21) Appl. No.: 15/281,335

(22) Filed: Sep. 30, 2016

(65) Prior Publication Data

US 2017/0087534 A1    Mar. 30, 2017

(30) Foreign Application Priority Data

Sep. 30, 2015   (JP) ................................ 2015-193158

(51) Int. Cl.
| | |
|---|---|
| *B01J 21/06* | (2006.01) |
| *C09D 1/00* | (2006.01) |
| *B01J 21/08* | (2006.01) |
| *B01J 35/00* | (2006.01) |
| *B01J 35/02* | (2006.01) |
| *B01J 37/02* | (2006.01) |
| *C09D 7/61* | (2018.01) |

(52) U.S. Cl.
CPC ............. *B01J 21/063* (2013.01); *B01J 21/08* (2013.01); *B01J 35/004* (2013.01); *B01J 35/02* (2013.01); *B01J 35/023* (2013.01); *B01J 37/0244* (2013.01); *C09D 1/00* (2013.01); *C09D 7/61* (2018.01)

(58) Field of Classification Search
CPC ........ B01J 21/063; B01J 35/023; B01J 35/02; B01J 37/0244; B01J 35/004; B01J 21/08; C09D 7/61; C09D 1/00
See application file for complete search history.

(56) References Cited

U.S. PATENT DOCUMENTS

| | | | | |
|---|---|---|---|---|
| 6,107,241 A | * | 8/2000 | Ogata .................... | B01J 21/063 423/608 |
| 6,228,480 B1 | | 5/2001 | Kimura et al. | |
| 6,337,129 B1 | * | 1/2002 | Watanabe .............. | B01J 35/002 428/328 |
| 8,449,662 B2 | * | 5/2013 | Wilson .................. | B08B 7/0057 106/2 |
| 2003/0166765 A1 | * | 9/2003 | Sugihara ................ | B01J 35/002 524/497 |
| 2004/0024108 A1 | * | 2/2004 | Sugihara ................ | B01J 21/063 524/497 |
| 2004/0254267 A1 | * | 12/2004 | Nagae .................... | B01J 35/002 523/333 |
| 2005/0129589 A1 | * | 6/2005 | Wei ....................... | B01D 53/864 422/177 |
| 2005/0129591 A1 | * | 6/2005 | Wei ........................ | A61L 9/205 422/186 |
| 2005/0266235 A1 | * | 12/2005 | Nakajima ................ | C08J 7/045 428/336 |
| 2005/0266248 A1 | * | 12/2005 | Millero ................. | C09D 5/1675 428/411.1 |
| 2005/0277543 A1 | * | 12/2005 | Takahashi ............ | C09D 5/1625 502/100 |
| 2006/0178264 A1 | * | 8/2006 | Kameshima ............ | B32B 27/10 502/439 |
| 2009/0162560 A1 | * | 6/2009 | DeLuca ................ | C01B 15/047 427/387 |
| 2009/0163647 A1 | * | 6/2009 | DeLuca .................. | B82Y 30/00 524/588 |
| 2011/0082027 A1 | * | 4/2011 | Kitazaki ................ | B01J 21/063 502/159 |
| 2011/0224066 A1 | * | 9/2011 | Schmidt .................. | A61L 9/205 502/5 |
| 2012/0040194 A1 | * | 2/2012 | Kanai .................... | B01J 35/004 428/447 |

(Continued)

FOREIGN PATENT DOCUMENTS

| | | |
|---|---|---|
| DE | 198 31 610 A1 | 1/1999 |
| EP | 1 101 803 A1 | 5/2001 |

(Continued)

OTHER PUBLICATIONS

Extended European search report dated Mar. 14, 2017, issued in the corresponding EP Patent Application 16191650.7.

*Primary Examiner* — Anthony J Zimmer
(74) *Attorney, Agent, or Firm* — Carrier Blackman & Associates, P.C.; Joseph P. Carrier; Anne G. Sabourin

(57) ABSTRACT

The present invention provides a photocatalyst coated body which can realize a sufficient photocatalytic activity and adhesiveness with a substrate, without significantly impairing an appearance of a substrate, especially an exterior building material. The photocatalyst coated body has a structure including a substrate, an intermediate layer formed on the substrate, and a photocatalyst layer formed on the intermediate layer. The intermediate layer includes inorganic oxide particles having an average particle diameter of nanosize. The photocatalyst layer includes photocatalyst particles having an average particle diameter of more than 0 μm to less than 10 μm and inorganic oxide particles having an average particle diameter of nanosize. A sum of a film thickness of the intermediate layer and a film thickness of the photocatalyst layer is 0.3 μm or more to 1.5 μm or less.

5 Claims, No Drawings

(56) References Cited

U.S. PATENT DOCUMENTS

| | | | | |
|---|---|---|---|---|
| 2013/0008585 A1* | 1/2013 | Hasskerl | ................ | B01J 21/063 |
| | | | | 156/71 |
| 2013/0121890 A1* | 5/2013 | Bae | ................ | B01D 53/02 |
| | | | | 422/187 |
| 2013/0168228 A1* | 7/2013 | Ozin | ................ | B01J 35/004 |
| | | | | 204/157.9 |
| 2013/0209809 A1* | 8/2013 | Kataoka | ................ | B01J 35/004 |
| | | | | 428/413 |
| 2013/0216458 A1* | 8/2013 | Nagae | ................ | B01J 21/066 |
| | | | | 423/210 |
| 2014/0066289 A1* | 3/2014 | Sahlin | ................ | B01J 37/0219 |
| | | | | 502/159 |
| 2014/0135209 A1* | 5/2014 | Kaburagi | ................ | B01J 23/30 |
| | | | | 502/318 |
| 2014/0186613 A1* | 7/2014 | Liang | ................ | C09D 5/006 |
| | | | | 428/328 |
| 2015/0336082 A1* | 11/2015 | Westermoen | ................ | B01J 21/063 |
| | | | | 502/350 |
| 2016/0151774 A1* | 6/2016 | Fukumura | ................ | C23C 14/0688 |
| | | | | 502/5 |

FOREIGN PATENT DOCUMENTS

| | | | | |
|---|---|---|---|---|
| GB | 2327428 A | * | 1/1999 | ............ B01J 35/002 |
| JP | 2010-172797 A | | 8/2010 | |
| WO | 95/11751 A1 | | 5/1995 | |

\* cited by examiner

PHOTOCATALYST COATED BODY AND METHOD OF MAKING

FIELD OF INVENTION

The present invention relates to a photocatalyst coated body, in more detail, to a photocatalyst coated body having an excellent self-cleaning function with rain.

BACKGROUND ART

In recent years, a photocatalyst such as titanium oxide has been used in many applications including an exterior material of an architectural structure. By utilizing an activity of the photocatalyst excited by a light energy, various harmful substances can be decomposed, or by hydrophilizing a film surface coated with a photocatalyst, a dirt which is attached to the film surface can be readily washed out with water. Followings are known as technologies to obtain a photocatalyst coated body coated with the photocatalyst mentioned above.

With regard to a composition to form a photocatalyst coated film on a surface of a substrate, for example, as described in WO 1995/11751 (Patent Literature 1), a mixture composition of a photocatalyst particle with a binder including a precursor to a silicone resin film, a silica fine particle, an alumina fine particle, and a mixture thereof is known.

Further, in a case that a hydrophilic photocatalyst coated film is formed on an organic substrate, as described in WO 1999/63011 (Patent Literature 2), in order to obtain a transparent and uniform photocatalyst coated film and to suppress deterioration of the painted surface due to photooxidation, a technology is shown wherein an intermediate layer is formed with a surface treating agent including a nonionic surfactant, or a fluorine based surfactant, or a mixture of them; a water-soluble solvent having a boiling point of 180 to 235° C., or an alcohol having 1 to 4 carbon atoms, or water, or a mixture of two or more of them; and a colloidal silica.

CITED REFERENCES

Patent Literatures

Patent Literature 1: WO 1995/11751
Patent Literature 2: WO 1999/63011

SUMMARY OF THE INVENTION when a photocatalyst coated film is formed by coating a mixture of a photocatalyst particle with a fine particle as a binder, as described in Patent Literature 1, directly onto an exterior building material (especially, a painted surface having a 60-degree gloss value of 50 or less), there has been a problem that an appearance of the photocatalyst coated film changes depending on a film thickness thereof. Namely, when the film thickness is in the range of 0.3 to 1 µm, that is, about the same as the wavelength of a visible light, there may be a case that an interference color occurs on the painted surface, which gives a glaring appearance or leads to an increase in a gloss value. When the film thickness is 2 µm or more, that is, much more than the wavelength of a visible light, there may be a case that the coated film is seen in a whitened appearance. When the film thickness is 0.3 µm or less, that is, much less than the wavelength of a visible light, there may be problems that the gloss value changes (increases) significantly and that a sufficient photocatalytic performance cannot be obtained. In addition, since the photocatalyst coated film is formed directly on the painted surface, there may be problems that the film is influenced by deterioration of a substrate caused by the photocatalyst and that a sufficient adhesiveness cannot be obtained.

Therefore, an object of the present invention is to provide a photocatalyst coated body which can realize a sufficient photocatalytic activity and adhesiveness with a substrate, without significantly impairing an appearance of a substrate, especially an exterior building material (especially, a painted surface having a 60-degree gloss value of 50 or less).

In order to solve the problems above, the present invention provides a photocatalyst coated body including a substrate, an intermediate layer formed on the substrate, and a photocatalyst layer formed on the intermediate layer, wherein the intermediate layer includes an inorganic oxide particle having an average particle diameter of nanosize, the photocatalyst layer includes a photocatalyst particle having an average particle diameter of more than 0 µm to less than 10 µm and an inorganic oxide particle having an average particle diameter of nanosize, and a sum of a film thickness of the intermediate layer and a film thickness of the photocatalyst layer is 0.3 µm or more to 1.5 µm or less.

In the photocatalyst coated body according to the present invention, the intermediate layer including an inorganic oxide particle of nanosize is interposed between the substrate and the photocatalyst layer. The inorganic oxide particle of nanosize has an excellent adhesiveness with both the substrate and the photocatalyst particle. In addition, the photocatalyst coated body is excellent in weather resistance because the photocatalyst particle does not contact directly with the substrate.

In the photocatalyst coated body according to the present invention, the photocatalyst particle has an average particle diameter of more than 0 µm to less than 10 µm. With regard to one factor for the occurrence a glare such as an interference color on the photocatalyst coated body having the photocatalyst coated on the substrate, the following may be considered. Namely, it is considered that when a titanium oxide having a large refractive index is used as the photocatalyst, since the size of the titanium oxide particle is much smaller than the wave length of a visible light and these particles are uniformly dispersed in the photocatalyst layer, the refractive index of the photocatalyst layer becomes relatively larger, thereby giving a glaring appearance. According to the present invention, however, photocatalyst particles which have an average particle diameter of more than 0 µm, preferably 1 µm or more to less than 10 µm, and have an much larger average particle diameter than the wavelength of a visible light, are used as photocatalyst particles, and such particles are dispersed in the photocatalyst layer, therefore, the refractive index of the photocatalyst layer does not become relatively larger, thereby an interference color is less likely to occur. Further, the photocatalyst particle having an average particle diameter of more than 0 µm, preferably 1 µm or more to less than 10 µm, can readily scatter a light and therefore has an effect to suppress a gloss change. Further, the photocatalyst particle having an average particle diameter of more than 0 µm, preferably 1 µm or more, becomes to a state that the particle is exposed on the outside of a surface of the photocatalyst layer, so that a sufficient photocatalytic activity can be realized. Further, the photocatalyst particle having an average particle diameter of more than 0 µm, preferably 1 µm or more to less than 10 µm, is fixed on the intermediate layer including the inorganic oxide particle having an average particle diameter of nanosize, so that it can be kept in a state of being apart from the substrate for a long period of time. Hence, in the photocatalyst coated body of the present invention, when the substrate surface is a painted surface, this painted surface is less likely to receive oxidation action caused by the photocatalyst, so that the photocatalyst coated body can obtain an excellent weather resistance.

Also, in the photocatalyst coated body according to the present invention, a sum of a film thickness of the intermediate layer and a film thickness of the photocatalytic layer is 0.3 μm or more to 1.5 μm or less. When the sum of the film thicknesses is less than 0.3 μm, there may be a case that a sufficient photocatalytic performance cannot be obtained even though an appearance of the coated body is excellent. When the sum of the film thicknesses is more than 1.5 μm, there may be a case that the appearance of the coated body is deteriorated due to whitening of the coated film, a significant decrease in gloss, or the like, even though a sufficient photocatalytic performance can be obtained. Therefore, according to the photocatalyst coated body of present invention, the excellent appearance and the sufficient photocatalytic activity can be simultaneously realized.

According to the present invention, a ratio of the mass of the photocatalyst particle relative to a total sum of the mass of the photocatalyst particle and the mass of the inorganic oxide particle in the photocatalyst layer is preferably 2% or more, and more preferably 2% or more by mass to less than 6% by mass. When the mass ratio of the photocatalyst particle is less than 2%, the effect to suppress gloss and the photocatalytic performance become poor, so that there may be a case that an desired function cannot be obtained. When the mass ratio of the photocatalyst particle is 6% or more, an desired appearance cannot be obtained because of an excessive decrease in a gloss value, and there may be a case that the adhesiveness with the substrate is impaired. Therefore, according to the photocatalyst coated body of the present invention, a good appearance with a gloss change suppressed and a sufficient photocatalytic activity can be obtained, and in addition, an adhesiveness with the substrate can be maintained.

According to the present invention, a photocatalyst coated body which can realize a sufficient photocatalytic activity and adhesiveness with a substrate can be obtained without significantly impairing an appearance of a substrate, especially an appearance of an exterior building material, due to the occurrence of an interference color, a gloss change, or the like.

DETAILED DESCRIPTION OF THE INVENTION

Photocatalyst Coated Body

The photocatalyst coated body according to the present invention includes a substrate, an intermediate layer formed on the substrate, and a photocatalyst layer formed on the intermediate layer.

Substrate

The substrate used in the present invention may be various materials regardless of an inorganic material and an organic material, so far as the materials can form the intermediate layer thereon. There is no particular restriction to the form of the substrate used in the present invention. Examples of the substrate that are preferable from the material point of view include a metal, a ceramic, a glass, a plastic, a rubber, a stone, a cement, a concrete, a fiber, a cloth, a wood, a paper, as well as a combination of them, a laminate of them, and a material having at least one coated film on the surface of them. Examples of the substrate that are preferable from the use point of view include general exterior materials including a building material, an exterior of a building, a window frame, a window glass, a structure member, an exterior and a coating of a vehicle, an exterior of a mechanical equipment and a product, a dust proofing cover and coating, a traffic sign board, various display equipment, an advertisement tower, a sound-sealing wall for road traffic, a sound-sealing wall for railway, a bridge, an exterior and a coating of a guard rail, an interior and a coating of a tunnel, an insulator, a solar cell cover, a heat collector cover of a solar water heater, an agricultural house, a cover for a illuminating light for vehicle, an outdoor illumination apparatus, a table, and a film, a sheet, and a seal with which a surface of the above products is adhered.

The substrate used in the present invention is preferably the one having a so-called semi-gloss surface with a 60-degree gloss value of 20 or more to 50 or less, more preferably the one having a painted surface with a 60-degree gloss value of 20 or more to 50 or less, and still more preferably the one having a painted surface with a 60-degree gloss value of 30 or more to 40 or less.

Intermediate Layer and Coating Solution for the Intermediate Layer

In the present invention, the intermediate layer includes an inorganic oxide particle having an average particle diameter of nanosize. The inorganic oxide particle having an average particle diameter of nanosize has an adhesiveness with the substrate and an adhesiveness with the photocatalyst particle, and thus can suppress deterioration of a surface of the substrate caused by the photocatalyst particle. The inorganic oxide particle used in the present invention is not particularly limited, so far as the inorganic oxide particle can form a layer. Preferable example of the inorganic oxide particle includes a particle of a single oxide such as silica, alumina, zirconia, ceria, yttria, boronia, magnesia, calcia, ferrite, amorphous titania, hafnia, as well as a particle of a composite oxide such as barium titanate and calcium silicate. Among them, the silica particle is more preferable. The term, nanosize means that an average particle diameter of a particle is more than 0 nm to less than 1000 nm. According to a preferred embodiment of the present invention, the intermediate layer is substantially formed of the inorganic oxide particle of nanosize. The words "the intermediate layer is substantially formed of the inorganic oxide particle of nanosize" means that the intermediate layer includes, for example, only a small amount of an unavoidable component other than the inorganic oxide particle. For example, the content of the inorganic oxide particle is preferably 90% or more by mass, more preferably 92% or more by mass, still more preferably about 100% by mass, relative to the total content of the entire intermediate layer.

In the present invention, the average particle diameter of the inorganic oxide particle is preferably more than 8 nm to less than 40 nm, more preferably 10 nm or more to less than 40 nm, still more preferably 10 nm or more to 30 nm or less. When the average particle diameter is more than 8 nm to less than 40 nm, the dispersibility of the inorganic oxide particle can be stable, so that the intermediate layer can obtain a high transparency and an adhesiveness with the substrate. The average particle diameter is calculated as a number-average value by measuring the lengths of visible 100 arbitrary particles when a cross section of the intermediate layer is observed with a scanning electron microscope at the magnification of 200,000 times. A shape of the particles is the most preferably a sphere, but a cross-sectional shape of the particles may be a non-circle, such as a rough circle or an oval. In this case, the length of the particle is roughly calculated by the equation of (long diameter+short diameter)/2.

The intermediate layer may further include a matrix component provided that the effects of the present invention are not impaired. The matrix component is at least one selected from the group consisting of, for example, a metal alkoxide, a product obtained by a process in which the metal alkoxide is subjected to a hydrolysis condensation reaction, an alkali silicate, an organometallic compound, a silicone, and a synthetic resin. The content of the matrix component is preferably less than 10% by mass, more preferably less than 8% by mass, relative to the total content of the entire intermediate layer.

In the present invention, a coating solution for the intermediate layer is used to form the intermediate layer of the photocatalyst coated body according to the present invention. The coating solution for the intermediate layer can be obtained by dispersing at least the inorganic oxide particle having an average particle diameter of nanosize in a dispersion medium.

With regard to the dispersion medium, any dispersion medium that is capable of properly dispersing the above-mentioned components can be used. The dispersion medium may be water or an organic solvent, and is preferably water, or a mixture of water with an organic solvent.

The coating solution for the intermediate layer may contain a surfactant as an arbitrary component. The surfactant may be added so that the intermediate layer contains the surfactant in an amount of 0% or more by mass to less than 10% by mass, preferably 0% or more by mass to 5% or less by mass, more preferably 0% or more by mass to 1% or less by mass. One effect of the surfactant is a leveling effect to the substrate. The amount of the surfactant may be properly determined within the foregoing range in accordance with a combination of the coating solution and the substrate. The lower limit of the amount may be 0.1% by mass. The surfactant is an effective component to improve a wetting property of the coating solution for the intermediate layer, while, in the intermediate layer formed after coating, the surfactant already corresponds to an unavoidable impurity which does not contribute to the effects of the photocatalyst coated body according to the present invention. Accordingly, the surfactant may be used within the above-mentioned content range in accordance with the wetting property required to the coating solution for the intermediate layer. When the wetting property does not matter, the surfactant may not be contained substantially or absolutely. The surfactant is selected in view of a dispersion stability of the inorganic oxide particle and the wetting property of the coating solution when coated on the substrate, a nonionic surfactant is preferable. With regard to the nonionic surfactant, an ether type nonionic surfactant, an ester type nonionic surfactant, a polyalkylene glycol type nonionic surfactant, a fluorine type nonionic surfactant, and a silicone type nonionic surfactant may be used.

In the present invention, the concentration of solid components in the coating solution for the intermediate layer is not particularly limited, the range of 1 to 15% by mass is preferable in view of easy application. Components in the coating solution for the intermediate layer are analyzed as follows. The coating solution is separated into a particle component and a filtrate by ultrafiltration. Then, each is analyzed with an infrared spectrometry, a gel permeation chromatography, an ICP mass spectrometry, an X-ray fluorescence spectrometry, and so on. By the analysis of the spectra thus obtained, components in the coating solution for the intermediate layer can be evaluated.

Production Method of the Intermediate Layer

The intermediate layer can be produced by applying the coating solution for the intermediate layer onto the substrate. Coating of the intermediate layer may be implemented with a generally and widely used method, wherein the coating solution for the intermediate layer is applied with a method including a brush coating method, a roller coating method, a spray coating method, a bar coating method, a roll coating method, a dip coating method, a flow coating method, a screen printing method, an electrodeposition method, and a vapor deposition method. After application of the coating solution for the intermediate layer onto the substrate, drying may be done at a normal temperature, or heat-drying may be done if necessary.

Film thickness of the intermediate layer is preferably 0.1 µm or more to 1 µm or less, more preferably 0.2 µm or more to 0.5 µm or less. When the film thickness is less than 0.1 µm, the function of the intermediate layer as a protective layer is weakened so that deterioration caused by the photocatalyst is likely to occur. When the film thickness is more than 1 µm, there is a possibility that the appearance of the photocatalyst coated body is whitened. The film thickness is calculated as an average value of the film thicknesses at 5 arbitrary positions when a cross section of the intermediate layer is observed with a scanning electron microscope at the magnification of 40,000 times. In the present invention, the intermediate layer may contain a particle larger than the above-mentioned range of the particle diameter provided that the effects of the present invention are not impaired. In this case, the film thickness of the intermediate layer is a value measured in the area excluding a convex portion formed of the larger particle.

Photocatalyst Layer and Coating Solution for the Photocatalyst Layer

In the present invention, the photocatalyst layer includes a photocatalyst particle having an average particle diameter of more than 0 µm to less than 10 µm and an inorganic oxide particle having an average particle diameter of nanosize. According to a preferred embodiment of the present invention, the photocatalyst particle has an average particle diameter of preferably 1 µm or more, more preferably 1 µm or more to 1.5 µm or less. Within this range, various film properties including a photocatalytic performance, a suppression of interference color, and a control of gloss can be efficiently expressed. In the present invention, the photocatalyst particle having an average particle diameter of less than 10 µm means that the photocatalyst particle having a particle size distribution in the range of more than 10 µm is not included. For example, when the particle diameter of all the photocatalyst particles present in the entirety of the photocatalyst layer is less than 10 µm, this case is within the scope of the present invention, but when even only one photocatalyst particle having the particle diameter of 10 µm or more is present, this case is outside the scope of the present invention. In the present invention, the photocatalyst particle having an average particle diameter of more than 0 µm means that the photocatalyst particle having the particle diameter of 1 µm or more is (invariably) contained, and means that the most frequent value in the particle size distribution is preferably more than 0.1 µm.

The average particle diameter of the particles above is calculated as a number-average value by measuring the lengths of visible 100 arbitrary particles when a surface of the photocatalyst layer is observed with a scanning electron microscope at the magnification of 5,000 times. A shape of the particles is the most preferably a sphere, but a cross-sectional shape of the particles may be a non-circle, such as a rough circle or an oval. In this case, the length of the particles is roughly calculated by the equation of (long diameter+short diameter)/2.

The photocatalyst particle used in the present invention is not particularly limited, so far as the photocatalyst particle is a particle having a photocatalytic activity. Example of the preferred photocatalyst particle includes a particle of a metal oxide such as titanium oxide ($TiO_2$), ZnO, $SnO_2$, $SrTiO_3$, $WO_3$, $Bi_2O_3$, and $Fe_2O_3$. A titanium oxide particle is more preferable. An anatase type titanium oxide particle is the most preferable. Titanium oxide has a high band-gap energy, and therefore requires an ultraviolet beam for photoexcitation and does not absorb a visible light during photoexcitation. Titanium oxide is thus advantageous in that coloring due to complementary color does not occur.

Titanium oxide particle is available in various forms including a powder form, a sol form, and a slurry form. Any form can be used so far as the form shows a photocatalytic activity.

The inorganic oxide particle, which has an average particle diameter of nanosize and is contained in the photocatalyst layer, has an adhesiveness with the intermediate layer and an adhesiveness with the photocatalyst particle. The inorganic oxide particle is not particularly limited, so far as the inorganic oxide particle can form a layer. Preferable example of the inorganic oxide particle includes a particle of a single oxide such as silica, alumina, zirconia, ceria, yttria, boronia, magnesia, calcia, ferrite, amorphous titania, hafnia, as well as a particle of a composite oxide such as barium titanate and calcium silicate. Among them, the silica particle is more preferable. More preferably, the inorganic oxide particle in the photocatalyst layer is a component or a material which is the same as those of the inorganic oxide particle in the intermediate layer.

In the present invention, the average particle diameter of the inorganic oxide particle contained in the photocatalyst layer is preferably more than 8 nm to less than 40 nm, more preferably 10 nm or more to less than 40 nm, still more preferably 10 nm or more to 30 nm or less. When the average particle diameter is more than 8 nm to less than 40 nm, the dispersibility of the inorganic oxide particle can be stable, so that the photocatalyst layer can obtain a high transparency and an adhesiveness with the intermediate layer. The average particle diameter of the inorganic oxide particle is calculated as a number-average value by measuring the lengths of visible 100 arbitrary particles when a cross section of the photocatalyst layer is observed with a scanning electron microscope at the magnification of 200,000 times. A shape of the particle is the most preferably a sphere, but a cross-sectional shape of the particle may be a non-circle, such as a rough circle or an oval. In this case, the length of the particle is roughly calculated by the equation of (long diameter+short diameter)/2.

The photocatalyst layer may further include a matrix component provided that the effects of the present invention are not impaired. The matrix component is at least one selected from the group consisting of, for example, a metal alkoxide, a product obtained by a process in which the metal alkoxide is subjected to a hydrolysis condensation reaction, an alkali silicate, an organometallic compound, a silicone, and a synthetic resin. The content of the matrix component is preferably less than 10% by mass, more preferably less than 8% by mass, relative to the the total content of the entire photocatalyst layer.

In the present invention, a coating solution for the photocatalyst layer is used to form the photocatalyst layer of the photocatalyst coated body according to the present invention. The coating solution for the photocatalyst layer can be obtained by dispersing at least the photocatalyst particle having an average particle diameter of more than 0 μm to less than 10 μm and the inorganic oxide particle having an average particle diameter of nanosize in a dispersion medium.

According to one embodiment of the present invention, the coating solution for the photocatalyst layer can be obtained by dispersing at least the titanium oxide particle having an average particle diameter of more than 0 μm to less than 10 μm and the silica particle having an average particle diameter of nanosize in a dispersion medium.

With regard to the dispersion medium, any dispersion medium that is capable of properly dispersing the above-mentioned components can be used. The dispersion medium may be water or an organic solvent, and is preferably water, or a mixture of water with an organic solvent.

The coating solution for the photocatalyst layer may contain a surfactant as an arbitrary component. The surfactant may be added so that the photocatalyst layer contains the surfactant in an amount of 0% or more by mass to less than 10% by mass, preferably 0% or more by mass to 5% or less by mass, more preferably 0% or more by mass to 1% or less by mass. One effect of the surfactant is a leveling effect to the intermediate layer. The amount of the surfactant may be properly determined within the foregoing range in accordance with a combination of the coating solution and the intermediate layer. The lower limit of the amount may be 0.1% by mass. The surfactant is an effective component to improve a wetting property of the coating solution for the photocatalyst layer, while, in the photocatalyst layer formed after coating, the surfactant already corresponds to an unavoidable impurity which does not contribute to the effects of the photocatalyst coated body according to the present invention. Accordingly, the surfactant may be used within the above-mentioned content range in accordance with the wetting property required to the coating solution for the photocatalyst layer. When the wetting property does not matter, the surfactant may not be contained substantially or absolutely. The surfactant is selected in view of a dispersion stability of the photocatalyst particle and the inorganic oxide particle as well as the wetting property of the coating solution when coated on the intermediate layer, a nonionic surfactant is preferable. With regard to the nonionic surfactant, an ether type nonionic surfactant, an ester type nonionic surfactant, a polyalkylene glycol type nonionic surfactant, a fluorine type nonionic surfactant, and a silicone type nonionic surfactant may be used.

In the present invention, the concentration of solid components in the coating solution for the photocatalyst layer is not particularly limited, the range of 1 to 15% by mass is preferable in view of easy application. Components in the coating solution for the photocatalyst layer are analyzed as follows. The coating solution is separated into a particle component and a filtrate by ultrafiltration. Then, each is analyzed with an infrared spectrometry, a gel permeation chromatography, an ICP mass spectrometry, an X-ray fluorescence spectrometry, and so on. By the analysis of the spectra thus obtained, components in the coating solution for the photocatalyst layer can be evaluated.

Production Method of the Photocatalyst Layer

The photocatalyst coated body of the present invention can be produced by applying the coating solution for the photocatalyst layer onto the intermediate layer formed on the substrate. Coating of the photocatalyst layer may be implemented with a generally and widely used method, wherein the coating solution for the photocatalyst layer is applied with a method including a brush coating method, a roller coating method, a spray coating method, a bar coating method, a roll coating method, a dip coating method, a flow coating method, a screen printing method, an electrodeposition method, and a vapor deposition method. After application of the coating solution for the photocatalyst layer onto the intermediate layer, drying may be done at a normal temperature or heat-drying may be done if necessary.

Film thickness of the photocatalyst layer is not particularly limited, and preferably 0.1 μm or more to 1 μm or less, more preferably 0.2 μm or more to 1 μm or less. When the film thickness is less than 0.1 μm, a photocatalytic performance, especially a decomposition performance of a harmful gas, is weakened. The film thickness is calculated as an average value of the film thicknesses at 5 arbitrary positions when a cross section of the photocatalyst layer is observed with a scanning electron microscope at the magnification of 40,000 times. In the present invention, the photocatalyst layer includes a particle component of nanosize and a particle component of micron size. The film thickness of the photocatalyst layer is a value measured in the area excluding a convex portion formed of the particle component of micron size.

EXAMPLES

The present invention is specifically explained on the basis of the following examples, but is not limited to the examples. In the following examples, the coating solution for the intermediate layer was prepared by appropriately mixing, in a dispersion medium, a water dispersion of a silica fine particle; and a nonionic surfactant; and if necessary, a titanium oxide powder, a PMMA powder, a water dispersion of a silica particle, or a silicone resin, or a combination of them. Raw materials used were as shown below. The average particle diameter described below of a silica fine particle was calculated as a number-average value by measuring the lengths of visible 100 arbitrary particles, after a intermediate layer was formed in the way as described later, and a cross section of the coated film was observed with a scanning electron microscope at the magnification of 200,000 times. The average particle diameter described below of a particle or a powder other than the silica fine particle was calculated as a number-average value by measuring the lengths of visible 100 arbitrary particles when a surface of the intermediate layer was observed with a scanning electron microscope at the magnification of 5,000 times. Also, the crystal diameter was measured by an X-ray diffraction method (XRD).

Water dispersion of a silica fine particle (average particle diameter: 15 nm, solid content: 30%, basic)
Water dispersion of a silica particle (average particle diameter: 700 nm, solid content: 25%, neutral)
Titanium oxide powder 1 (crystal dimeter: 7 nm, specific surface area: 300 m$^2$/g, average particle diameter: 1.2 μm)
PMMA powder (average particle diameter: 3 μm)
Surfactant: polyoxyethylene-modified nonionic surfactant
Dispersion medium: ion-exchanged water
Silicone-modified acrylic resin: water dispersion of silicone-modified acrylic resin emulsion In the following examples, the coating solution for the photocatalyst layer was prepared by appropriately mixing, in a dispersion medium, a water dispersion of a silica fine particle; a nonionic surfactant; and a titanium oxide powder or a water dispersion of a titanium oxide fine particle; and if necessary, a water dispersion of a silica particle, an amine-based dispersant, or a PMMA powder. Raw materials used were as shown below. The average particle diameter described below of a silica fine particle was calculated as a number-average value by measuring the lengths of visible 100 arbitrary particles, after the photocatalyst layer was formed in the way as described later, and a cross section of the coated film was observed with a scanning electron microscope at the magnification of 200,000 times. The average particle diameter described below of a particle or a powder other than the silica fine particle was calculated as a number-average value by measuring the lengths of visible 100 arbitrary particles when a surface of the photocatalyst layer was observed with a scanning electron microscope with the magnification of 5,000 times. Also, the crystal diameter was measured by an X-ray diffraction method (XRD).

Water dispersion of a silica fine particle (average particle diameter: 15 nm, solid content: 30%, basic)
Titanium oxide powder 1 (crystal dimeter: 7 nm, specific surface area: 300 m$^2$/g, average particle diameter: 1.2 μm)
Titanium oxide powder 2 (crystal dimeter: 15 nm, specific surface area: 225 m$^2$/g, average particle diameter: 1.8 μm)
Titanium oxide powder 3 (crystal dimeter: 6 nm, specific surface area: 280 m$^2$/g, average particle diameter: 1.0 μm)
Water dispersion of a titanium oxide fine particle (average particle diameter: 40 nm, solid content: 17.5%, basic)
Water dispersion of a silica particle (average particle diameter: 700 nm, solid content: 25%, neutral)
PMMA powder (average particle diameter: 3 μm)
Surfactant: polyoxyethylene-modified nonionic surfactant
Amine-based dispersant (basic)

Preparation of Photocatalyst Coated Body

A photocatalyst coated body having a intermediate layer and a photocatalyst layer was produced in the following way. To begin with, an aluminum plate was prepared as a substrate. The surface of the aluminum plate is coated with a polyester paint. The 60-degree gloss value of the aluminum plate before coating of the coating solution for the intermediate layer and the coating solution for the photocatalyst layer was 35. Each of the coating solutions B1 to B4, B6, and B7 to B9 for the intermediate layer was applied onto the aluminum plate with a bar coater in the application amount of about 5 g/m$^2$ to obtain a wet film. The wet film was dried at 150° C. for 30 seconds to obtain a intermediate layer. On a side note, the coating solution B5 was applied with an air spray in the application amount of about 10 g/m$^2$ to obtain a wet film, and the wet film was dried at 80° C. for 2 minutes to obtain a intermediate layer.

Next, any of the coating solutions T1 to T12 for the photocatalyst layer was applied onto the intermediate layer with a bar coater in the application amount of 5 g/m$^2$ to obtain the wet film. The wet film was dried at 150° C. for 30 seconds to obtain the photocatalyst layer. In this way, the intermediate layer and the photocatalyst layer were formed to obtain the photocatalyst coated body. The composition of the intermediate layer (or the coating solution for the intermediate layer) and the composition of the photocatalyst layer (or the coating solution for the photocatalyst layer) of each photocatalyst coated body are shown in Table 1.

TABLE 1

| | | Coating solution for intermediate layer | | | | | | | Coating solution for photocatalyst layer | | | | | | | | | |
|---|---|---|---|---|---|---|---|---|---|---|---|---|---|---|---|---|---|---|
| | | Kind of solution | SiO2 fine particle (15 nm) | Surfactant | TiO2 powder 1 (1.2 μm) | SiO2 particle (700 nm) | PMMA particle (3 μm) | Silicone | Kind of solution | TiO2 powder 1 (1.2 μm) [7 nm] without particle more than 10 μm | TiO2 powder 2 (1.8 μm) [15 nm] with particle more than 10 μm | TiO2 powder 3 (1.0 μm) [6 nm] without particle more than 10 μm | TiO2 fine particle (40 nm) [15 nm] | SiO2 fine particle (15 nm) | SiO2 particle (700 nm) | PMMA particle (3 μm) | Surfactant | Silicone |
| Example | Ex 1 | B1 | 6% | 0.8% | — | — | — | — | T1 | 0.2% | — | — | — | 5.8% | — | — | 0.6% | — |
| | Ex 2 | B2 | 5.7% | 0.8% | 0.3% | — | — | — | T2 | — | — | — | 0.2% | 5.8% | — | — | 0.6% | — |
| | Ex 3 | B1 | 6% | 0.8% | — | — | — | — | T3 | — | — | — | 0.2% | 5.5% | 0.3% | — | 0.6% | — |
| | Ex 4 | B3 | 5.7% | 0.8% | — | 0.3% | — | — | T2 | — | — | — | 0.2% | 5.8% | — | — | 0.6% | — |
| | Ex 5 | B1 | 6% | 0.8% | — | — | — | — | T4 | — | — | — | 0.2% | 5.4% | — | 0.4% | 0.6% | — |
| | Ex 6 | B4 | 5.6% | 0.8% | — | — | 0.4% | — | T2 | — | — | — | 0.2% | 5.8% | — | — | 0.6% | — |
| | Ex 7 | B1 | 6% | 0.8% | — | — | — | — | T2 | — | — | — | 0.2% | 5.8% | — | — | 0.6% | — |
| | Ex 8 | B5 | — | — | — | — | — | 20% | T1 | 0.2% | — | — | — | 5.8% | — | — | 0.6% | — |
| Example | Ex 9 | B1 | 6% | 0.8% | — | — | — | — | T5 | 0.1% | — | — | — | 5.9% | — | — | 0.6% | — |
| Example | Ex 10 | B1 | 6% | 0.8% | — | — | — | — | T6 | 0.3% | — | — | — | 5.7% | — | — | 0.6% | — |
| Example | Ex 11 | B6 | 3% | 0.8% | — | — | — | — | T7 | 0.1% | — | — | — | 2.9% | — | — | 0.6% | — |
| Example | Ex 12 | B1 | 6% | 0.8% | — | — | — | — | T8 | 0.5% | — | — | — | 14.5% | — | — | 0.6% | — |
| | Ex 13 | B7 | 15% | 0.8% | — | — | — | — | T8 | 0.5% | — | — | — | 14.5% | — | — | 0.6% | — |
| | Ex 14 | B1 | 6% | 0.8% | — | — | — | — | T9 | — | 0.2% | — | — | 5.8% | — | — | 0.6% | — |
| | Ex 15 | B8 | 1.5% | 0.8% | — | — | — | — | T10 | 0.05% | — | — | — | 1.5% | — | — | 0.6% | — |
| Example | Ex 16 | B8 | 1.5% | 0.8% | — | — | — | — | T7 | 0.1% | — | — | — | 2.9% | — | — | 0.6% | — |
| | Ex 17 | B9 | 12% | 0.8% | — | — | — | — | T11 | 0.4% | — | — | — | 11.6% | — | — | 0.6% | — |
| Example | Ex 18 | B1 | 6% | 0.8% | — | — | — | — | T12 | — | — | 0.2% | — | 5.8% | — | — | 0.6% | — |

Coating Solution B1 for the Intermediate Layer

Coating solution B1 for the intermediate layer was prepared by adding the water dispersion of the silica fine particle and the surfactant to the dispersion medium followed by stirring the resulting mixture with a planetary centrifugal mixer. The concentration of the silica fine particle in the coating solution was 6% by mass, and the concentration of the surfactant in the same was 0.8% by mass.

Coating Solution B2 for the Intermediate Layer

Coating solution B2 for the intermediate layer was prepared as follows. The surfactant was added to the dispersion medium, to which the titanium oxide powder 1 was added, followed by stirring the resulting mixture with a planetary centrifugal mixer. Thereafter, the water dispersion of the silica fine particle was added to the mixture, and then, the mixture was stirred with a planetary centrifugal mixer to obtain the coating solution. The concentration of the silica fine particle in the coating solution was 5.7% by mass, the concentration of titanium oxide in the same was 0.3% by mass, and the concentration of the surfactant in the same was 0.8% by mass.

Coating Solution B3 for the Intermediate Layer

Coating solution B3 for the intermediate layer was prepared by adding the water dispersion of the silica fine particle, the water dispersion of the silica particle, and the surfactant to the dispersion medium followed by stirring the resulting mixture with a planetary centrifugal mixer. The concentration of the silica fine particle in the coating solution was 5.7% by mass, the concentration of the silica particle in the same was 0.3% by mass, and the concentration of the surfactant in the same was 0.8% by mass.

Coating Solution B4 for the Intermediate Layer

Coating solution B4 for the intermediate layer was prepared as follows. The surfactant was added to the dispersion medium, to which the PMMA particle was added, followed by stirring the resulting mixture with a planetary centrifugal mixer. Thereafter, the water dispersion of the silica fine particle was mixed with the mixture, and then, the mixture was stirred with a planetary centrifugal mixer to obtain the coating solution. The concentration of the silica fine particle in the coating solution was 5.6% by mass, the concentration of the PMMA particle in the same was 0.4% by mass, and the concentration of the surfactant in the same was 0.8% by mass.

Coating Solution B5 for the Intermediate Layer

Coating solution B5 for the intermediate layer was prepared by diluting a commercially available silicone-modified acrylic resin with water. The concentration of the silicone-modified acrylic resin in the coating solution was 20% by mass.

Coating Solution B6 for the Intermediate Layer

Coating solution B6 for the intermediate layer was prepared in the same way as B1 except that the concentration of the water dispersion of the silica fine particle was 3% by mass.

Coating Solution B7 for the Intermediate Layer

Coating solution B7 for the intermediate layer was prepared in the same way as B1 except that the concentration of the water dispersion of the silica fine particle was 15% by mass.

Coating Solution B8 for the Intermediate Layer

Coating solution B8 for the intermediate layer was prepared in the same way as B1 except that the concentration of the water dispersion of the silica fine particle was 1.5% by mass.

Coating Solution B9 for the Intermediate Layer

Coating solution B9 for the intermediate layer was prepared in the same way as B1 except that the concentration of the water dispersion of the silica fine particle was 12% by mass.

Coating Solution T1 for the Photocatalyst Layer

Coating solution T1 for the photocatalyst layer was prepared as follows. The amine-based dispersant was added to the dispersion medium, to which the titanium oxide powder 1 was added, followed by stirring the resulting mixture with a planetary centrifugal mixer. Thereafter, the water dispersion of the silica fine particle and the surfactant were added to the mixture, and then, the mixture was stirred with a planetary centrifugal mixer to obtain the coating solution. The concentration of titanium oxide in the coating solution was 0.2% by mass, the concentration of the silica fine particle in the same was 5.8% by mass, and the concentration of the surfactant in the same was 0.6% by mass.

Coating Solution T2 for the Photocatalyst Layer

Coating solution T2 for the photocatalyst layer was prepared by adding the water dispersion of the titanium oxide fine particle, the water dispersion of the silica fine particle, and the surfactant to the dispersion medium followed by stirring the resulting mixture with a planetary centrifugal mixer. The concentration of titanium oxide in the coating solution was 0.2% by mass, the concentration of the silica fine particle in the same was 5.8% by mass, and the concentration of the surfactant in the same was 0.6% by mass.

Coating Solution T3 for the Photocatalyst Layer

Coating solution T3 for the photocatalyst layer was prepared by adding the water dispersion of the titanium oxide fine particle, the water dispersion of the silica particle, the water dispersion of the silica fine particle, and the surfactant to the dispersion medium followed by stirring the resulting mixture with a planetary centrifugal mixer. The concentration of titanium oxide in the coating solution was 0.2% by mass, the concentration of the silica fine particle in the same was 5.5% by mass, the concentration of the silica particle in the same was 0.3% by mass, and the concentration of the surfactant in the same was 0.6% by mass.

Coating Solution T4 for the Photocatalyst Layer

Coating solution T4 for the photocatalyst layer was prepared as follows. The surfactant and the PMMA particle were added to the dispersion medium, and the resulting mixture was stirred with a planetary centrifugal mixer. Thereafter, the water dispersion of the titanium oxide fine particle and the water dispersion of the silica fine particle were added to the mixture, and then, the mixture was stirred with a planetary centrifugal mixer to obtain the coating solution. The concentration of titanium oxide in the coating solution was 0.2% by mass, the concentration of the silica fine particle in the same was 5.4% by mass, the concentration of PMMA in the same was 0.4% by mass, and the concentration of the surfactant in the same was 0.6% by mass.

Coating Solution T5 for the Photocatalyst Layer

Coating solution T5 for the photocatalyst layer was prepared in the same way as T1 except that the concentration of the titanium oxide powder was 0.1% by mass and the concentration of the silica fine particle was 5.9% by mass.

Coating Solution T6 for the Photocatalyst Layer

Coating solution T6 for the photocatalyst layer was prepared in the same way as T1 except that the concentration of the titanium oxide powder was 0.3% by mass and the concentration of the silica fine particle was 5.7% by mass.

Coating Solution T7 for the Photocatalyst Layer

Coating solution T7 for the photocatalyst layer was prepared in the same way as T1 except that the concentration of the titanium oxide powder was 0.1% by mass and the concentration of the silica fine particle was 2.9% by mass.

Coating Solution T8 for the Photocatalyst Layer

Coating solution T8 for the photocatalyst layer was prepared in the same way as T1 except that the concentration of the titanium oxide powder was 0.5% by mass and the concentration of the silica fine particle was 14.5% by mass.

Coating Solution T9 for the Photocatalyst Layer

Coating solution T9 for the photocatalyst layer was prepared as follows. The amine-based dispersant was added to the dispersion medium, to which the titanium oxide powder 2 was added, followed by stirring the resulting mixture with a planetary centrifugal mixer. Thereafter, the water dispersion of the silica fine particle and the surfactant were added to the mixture, and then, the mixture was stirred with a planetary centrifugal mixer to obtain the coating solution. The concentration of the silica fine particle in the coating solution was 5.8% by mass, the concentration of the titanium oxide powder in the same was 0.2% by mass, and the concentration of the surfactant in the same was 0.6% by mass.

Coating Solution T10 for the Photocatalyst Layer

Coating solution T10 for the photocatalyst layer was prepared in the same way as T1 except that the concentration of the titanium oxide powder was 0.05% by mass and the concentration of the silica fine particle was 1.5% by mass.

Coating Solution T11 for the Photocatalyst Layer

Coating solution T11 for the photocatalyst layer was prepared in the same way as T1 except that the concentration of the titanium oxide powder was 0.4% by mass and the concentration of the silica fine particle was 11.6% by mass.

Coating Solution T12 for the Photocatalyst Layer

Coating solution T12 for the photocatalyst layer was prepared as follows. The amine-based dispersant was added to the dispersion medium, to which the titanium oxide powder 3 was added, followed by stirring the resulting mixture with a planetary centrifugal mixer. Thereafter, the water dispersion of the silica fine particle and the surfactant were added to the mixture, and then, the mixture was stirred with a planetary centrifugal mixer to obtain the coating solution. The concentration of the silica fine particle in the coating solution was 5.8% by mass, the concentration of the titanium oxide powder in the same was 0.2% by mass, and the concentration of the surfactant in the same was 0.6% by mass.

No. 1: Example

The photocatalyst coated body was produced by using the coating solution B1 for the intermediate layer and the coating solution T1 for the photocatalyst layer, and then, various evaluations were carried out. Each of the film thickness of the intermediate layer and the film thickness of the photocatalyst layer observed with a scanning electron microscope was about 0.4 μm.

No. 2

The photocatalyst coated body was produced by using the coating solution B2 for the intermediate layer and the coating solution T2 for the photocatalyst layer, and then, various evaluations were carried out. Each of the film thickness of the intermediate layer and the film thickness of the photocatalyst layer observed with a scanning electron microscope was about 0.4 μm.

No. 3

The photocatalyst coated body was produced by using the coating solution B1 for the intermediate layer and the coating solution T3 for the photocatalyst layer, and then, various evaluations were carried out. Each of the film thickness of the intermediate layer and the film thickness of the photocatalyst layer observed with a scanning electron microscope was about 0.4 μm.

No. 4

The photocatalyst coated body was produced by using the coating solution B3 for the intermediate layer and the coating solution T2 for the photocatalyst layer, and then, various evaluations were carried out. Each of the film thickness of the intermediate layer and the film thickness of the photocatalyst layer observed with a scanning electron microscope was about 0.4 μm.

No. 5

The photocatalyst coated body was produced by using the coating solution B1 for the intermediate layer and the coating solution T4 for the photocatalyst layer, and then, various evaluations were carried out. Each of the film thickness of the intermediate layer and the film thickness of the photocatalyst layer observed with a scanning electron microscope was about 0.4 μm.

No. 6

The photocatalyst coated body was produced by using the coating solution B4 for the intermediate layer and the coating solution T2 for the photocatalyst layer, and then, various evaluations were carried out. Each of the film thickness of the intermediate layer and the film thickness of the photocatalyst layer observed with a scanning electron microscope was about 0.4 μm.

No. 7

The photocatalyst coated body was produced by using the coating solution B1 for the intermediate layer and the coating solution T2 for the photocatalyst layer; and then, various evaluations were carried out. Each of the film thickness of the intermediate layer and the film thickness of the photocatalyst layer observed with a scanning electron microscope was about 0.4 μm.

No. 8

The photocatalyst coated body was produced by using the coating solution B5 for the intermediate layer and the coating solution T1 for the photocatalyst layer, and then, various evaluations were carried out. The film thickness of the intermediate layer and the film thickness of the photocatalyst layer were measured by observation with a scanning electron microscope. The film thickness of the intermediate layer was about 1.5 μm. The film thickness of the photocatalyst layer was about 0.4 μm.

No. 9: Example

The photocatalyst coated body was produced by using the coating solution B1 for the intermediate layer and the coating solution T5 for the photocatalyst layer, and then, various evaluations were carried out. Each of the film thickness of the intermediate layer and the film thickness of the photocatalyst layer observed with a scanning electron microscope was about 0.4 μm.

No. 10: Example

The photocatalyst coated body was produced by using the coating solution B1 for the intermediate layer and the coating solution T6 for the photocatalyst layer, and then, various evaluations were carried out. Each of the film thickness of the intermediate layer and the film thickness of the photocatalyst layer observed with a scanning electron microscope was about 0.4 μm.

No. 11: Example

The photocatalyst coated body was produced by using the coating solution B6 for the intermediate layer and the coating solution T7 for the photocatalyst layer, and then, various evaluations were carried out. Each of the film thickness of the intermediate layer and the film thickness of the photocatalyst layer observed with a scanning electron microscope was about 0.2 μm.

No. 12: Example

The photocatalyst coated body was produced by using the coating solution B1 for the intermediate layer and the coating solution T8 for the photocatalyst layer, and then, various evaluations were carried out. The film thickness of the intermediate layer and the film thickness of the photocatalyst layer were measured by observation with a scanning electron microscope. The film thickness of the intermediate layer was about 0.4 μm. The film thickness of the photocatalyst layer was about 1.0 μm.

No. 13

The photocatalyst coated body was produced by using the coating solution B7 for the intermediate layer and the coating solution T8 for the photocatalyst layer, and then, various evaluations were carried out. Each of the film thickness of the intermediate layer and the film thickness of the photocatalyst layer observed with a scanning electron microscope was about 1.0 μm.

No. 14

The photocatalyst coated body was produced by using the coating solution B1 for the intermediate layer and the coating solution T9 for the photocatalyst layer, and then, various evaluations were carried out. Each of the film thickness of the intermediate layer and the film thickness of the photocatalyst layer observed with a scanning electron microscope was about 0.4 μm.

No. 15

The photocatalyst coated body was produced by using the coating solution B8 for the intermediate layer and the coating solution T10 for the photocatalyst layer, and then, various evaluations were carried out. Each of the film thickness of the intermediate layer and the film thickness of the photocatalyst layer observed with a scanning electron microscope was about 0.1 μm.

No. 16: Example

The photocatalyst coated body was produced by using the coating solution B8 for the intermediate layer and the coating solution T7 for the photocatalyst layer, and then, various evaluations were carried out. The film thickness of the intermediate layer and the film thickness of the photocatalyst layer were measured by observation with a scanning electron microscope. The film thickness of the intermediate layer was about 0.1 μm. The film thickness of the photocatalyst layer was about 0.2 μm.

No. 17

The photocatalyst coated body was produced by using the coating solution B9 for the intermediate layer and the coating solution T11 for the photocatalyst layer, and then, various evaluations were carried out. Each of the film thickness of the intermediate layer and the film thickness of the photocatalyst layer observed with a scanning electron microscope was about 0.8 μm.

No. 18: Example

The photocatalyst coated body was produced by using the coating solution B1 for the intermediate layer and the coating solution T12 for the photocatalyst layer, and then, various evaluations were carried out. Each of the film thickness of the intermediate layer and the film thickness of the photocatalyst layer observed with a scanning electron microscope was about 0.4 μm.

Method for Measurement of the Film Thicknesses

Intermediate layer

The film thickness of the intermediate layer was measured with a scanning electron microscope. The cross section of the intermediate layer was observed at the magnification of 40,000 times. The average value of the film thicknesses at 5 arbitrarily positions selected from the portion mainly formed of the silica fine particle was regarded as the film thickness of the intermediate layer. A convex portion formed of the silica particle, the titanium oxide powder, or the PMMA particle was not included in the measurement area of the film thickness.

Photocatalyst Layer

The film thickness of the photocatalyst layer was measured with a scanning electron microscope. The cross section of the photocatalyst layer was observed at the magnification of 40,000 times. The average value of the film thicknesses at 5 arbitrarily positions selected from the portion mainly formed of the silica fine particle, or the portion mainly formed of the silica fine particle and the titanium oxide fine particle was regarded as the film thickness of the photocatalyst layer. A convex portion formed of the silica particle, the titanium oxide powder, or the PMMA particle was not included in the measurement area of the film thickness.

The photocatalyst coated body thus obtained was statically placed for 1 day at room temperature, and then, gloss value, presence or absence of interference color, ΔE, adhesiveness of the coated film, photocatalytic activity, and weather resistance were evaluated.

The gloss value was measured with a glossmeter (VG-2000 type; manufactured by Nippon Denshoku Industries, Co., Ltd.). The gloss value thus measured was compared with the gloss value before coating. The effect to suppress an increase of gloss was judged by comparing with the value of Example 7 in which the particles of micron size is not substantially present.

Presence or absence of interference color was evaluated by comparing with the uncoated substrate by visual inspection. The evaluation criteria were as follows.

◯: Excellent: Almost no interference color occurred.

Δ: Good: Interference color slightly occurred.

×: Poor: Interference color occurred.

ΔE* was measured by using a color measuring colorimeter ZE-2000 (manufactured by Nippon Denshoku Industries, Co., Ltd.). L*, a*, and b* values in the coated substrate (hereinafter referred to as $L^*_1$, $a^*_1$, and $b^*_1$, respectively) and L*, a*, and b* values in the uncoated substrate (hereinafter referred to as $L^*_2$, $a^*_2$, and $b^*_2$, respectively) were measured, and then, ΔE* was calculated by Equation 1.

$$\Delta E^* = ((L^*_2 - L^*_1)^2 + (a^*_2 - a^*_1)^2 + (b^*_2 - b^*_1)^2)^{1/2} \quad \text{(Equation 1)}$$

The adhesiveness of the coated film was evaluated by visual inspection of the condition of the coated film after rubbing thereof 10 times with a load of 500 g/cm² by using a commercially available wiper (K-Dry; manufactured by Nippon Paper Crecia Co., Ltd.).

◯: Excellent: there is recognized no removal of the coated film.

×: Poor: there is recognized a removal of the coated film.

The photocatalytic activity was evaluated as the decomposition of methylene blue by the method in conformity with ISO 10678.

◯: Excellent: sufficient decomposition activity of methylene blue was recognized.

×: Poor: sufficient decomposition activity of methylene blue was not recognized.

The weather resistance was measured by the accelerated weathering test by using the apparatus ACUVEX (registered trade mark) on the basis of the standard number: ASTM G90 in the State of Arizona, USA, under the condition of the spray cycle: Cycle 3. The weather resistance was evaluated in accordance with the following criteria.

◯: Slight: changes in color tone and gloss before and after the accelerated weathering test were either slightly recognized or not recognized by an eye observation.

×: Severe: significant changes in color tone and gloss before and after the accelerated weathering test were recognized by visual inspection.

Δ: Moderate: changes in color tone and gloss before and after the accelerated weathering test were within an acceptable range by visual inspection.

The evaluation Results above were summarized in Table 2. The blanks in Table 2 mean that the evaluation was not carried out because the appearance of the photocatalyst coated body was not good.

TABLE 2

| | | Film thickness, intermediate layer | Film thickness, photocatalyst layer | Film thickness, sum | Photocatalyst layer [TiO2] | 60° Gloss | Gloss change | Interference color | ΔE* | Adhesiveness | Photocatalytic performance | Weather resistance |
|---|---|---|---|---|---|---|---|---|---|---|---|---|
| Example | No. 1 | 0.4 μM | 0.4 μM | 0.8 μM | 3.5% | 34.9 | ±0 | ◯ | 1.58 | ◯ | ◯ | ◯ |
| | No. 2 | 0.4 μM | 0.4 μM | 0.8 μM | 3.5% | 35 | +0.1 | × | 0.98 | × | ◯ | × |
| | No. 3 | 0.4 μM | 0.4 μM | 0.8 μM | 3.5% | 33.1 | −1.8 | Δ | 1.35 | ◯ | ◯ | × |
| | No. 4 | 0.4 μM | 0.4 μM | 0.8 μM | 3.5% | 36.4 | +1.5 | × | 0.51 | × | ◯ | × |
| | No. 5 | 0.4 μM | 0.4 μM | 0.8 μM | 6% | 39.9 | +5.0 | Δ | 1.00 | ◯ | ◯ | × |
| | No. 6 | 0.4 μM | 0.4 μM | 0.8 μM | 3.5% | 31.5 | −3.4 | × | 1.38 | × | ◯ | × |
| | No. 7 | 0.4 μM | 0.4 μM | 0.8 μM | 3.5% | 48.2 | +13.3 | × | 0.37 | ◯ | ◯ | × |
| | No. 8 | 1.5 μM | 0.4 μM | 1.9 μM | 3.5% | | | ◯ | | × | ◯ | |

TABLE 2-continued

| | | Film thickness, intermediate layer | Film thickness, photocatalyst layer | Film thickness, sum | Photocatalyst layer [TiO2] | 60° Gloss | Gloss change | Interference color | ΔE* | Adhesiveness | Photocatalytic performance | Weather resistance |
|---|---|---|---|---|---|---|---|---|---|---|---|---|
| Example | No. 9 | 0.4 μM | 0.4 μM | 0.8 μM | 2% | 41.9 | +7.0 | ○ | 0.70 | ○ | ○ | ○ |
| Example | No. 10 | 0.4 μM | 0.4 μM | 0.8 μM | 5% | 32.9 | −2.0 | ○ | 1.95 | ○ | ○ | Δ |
| Example | No. 11 | 0.2 μM | 0.2 μM | 0.4 μM | 3.5% | 39.5 | +4.6 | ○ | 1.61 | ○ | ○ | ○ |
| Example | No. 12 | 0.4 μM | 1.0 μM | 1.4 μM | 3.5% | 29.1 | −5.8 | ○ | 2.58 | ○ | ○ | |
| | No. 13 | 1.0 μM | 1.0 μM | 2.0 μM | 3.5% | 19.6 | −15.3 | ○ | 3.48 | ○ | ○ | |
| | No. 14 | 0.4 μM | 0.4 μM | 0.8 μM | 3.5% | 37.2 | +2.3 | ○ | 2.30 | x | ○ | ○ |
| | No. 15 | 0.1 μM | 0.1 μM | 0.2 μM | 1.5% | 35.5 | +0.6 | ○ | 1.02 | ○ | Δ | ○ |
| Example | No. 16 | 0.1 μM | 0.2 μM | 0.3 μM | 3.0% | 34.7 | −0.2 | ○ | 1.98 | ○ | ○ | ○ |
| | No. 17 | 0.8 μM | 0.8 μM | 1.6 μM | 3.0% | 24.2 | −10.7 | ○ | 3.41 | ○ | ○ | Δ |
| Example | No. 18 | 0.4 μM | 0.4 μM | 0.8 μM | 3.5% | 34.9 | ±0 | ○ | 1.6 | ○ | ○ | ○ |

What is claimed is:

1. A photocatalyst coated body comprising a substrate, an intermediate layer formed on the substrate, and a photocatalyst layer formed on the intermediate layer, wherein
the intermediate layer comprises an inorganic oxide particle having an average particle diameter of more than 0 nm to less than 1000 nm,
the photocatalyst layer comprises a photocatalyst particle having an average particle diameter of 1 μm or more to less than 10 μm, and an inorganic oxide particle having an average particle diameter of more than 0 nm to less than 1000 nm,
a sum of a film thickness of the intermediate layer and a film thickness of the photocatalyst layer is 0.3 μm or more to 1.5 μm or less, and
the film thickness of the intermediate layer is 0.2 μm or more to 0.5 μm or less,
the photocatalyst particle is titanium dioxide, and
the film thickness of the photocatalyst layer is a value measured in the area excluding a convex portion formed of the photocatalyst particles.

2. The photocatalyst coated body according to claim 1, wherein a ratio of the mass of the photocatalyst particle relative to a total sum of the mass of the photocatalyst particle and the mass of the inorganic oxide particle in the photocatalyst layer is 2% or more.

3. The photocatalyst coated body according to claim 2, wherein a ratio of the mass of the photocatalyst particle relative to a total sum of the mass of the photocatalyst particle and the mass of the inorganic oxide particle in the photocatalyst layer is less than 6%.

4. The photocatalyst coated body according to claim 1, wherein the photocatalyst coated body is used for an exterior material.

5. The photocatalyst coated body according to claim 4, wherein a surface of the exterior material comprises a painted surface having a 60-degree gloss value of 20 or more to 50 or less.

* * * * *